(12) United States Patent
Takashima et al.

(10) Patent No.: US 10,028,449 B2
(45) Date of Patent: Jul. 24, 2018

(54) METHOD FOR RAISING LEAF-AND-STEM VEGETABLES AND LIGHT SOURCE DEVICE FOR RAISING LEAF-AND-STEM VEGETABLES

(71) Applicants: FUJI SEIKO CO., LTD., Hashima-shi (JP); FUJI SHOJI CO., LTD., Hashima-shi (JP)

(72) Inventors: Katsunori Takashima, Hashima (JP); Daisuke Matsuzaki, Hashima (JP)

(73) Assignees: FUJI SEIKO CO., LTD., Hashima-shi (JP); FUJI SHOJI CO., LTD., Hashima-shi (JP)

(*) Notice: Subject to any disclaimer, the term of this patent is extended or adjusted under 35 U.S.C. 154(b) by 176 days.

(21) Appl. No.: 14/763,560

(22) PCT Filed: Feb. 17, 2014

(86) PCT No.: PCT/JP2014/053663
§ 371 (c)(1),
(2) Date: Jul. 27, 2015

(87) PCT Pub. No.: WO2014/132828
PCT Pub. Date: Sep. 4, 2014

(65) Prior Publication Data
US 2016/0007543 A1 Jan. 14, 2016

(30) Foreign Application Priority Data
Feb. 26, 2013 (JP) .................................. 2013-035849

(51) Int. Cl.
*A01G 7/04* (2006.01)
*F21K 9/00* (2016.01)
*A01G 22/00* (2018.01)

(52) U.S. Cl.
CPC ............. *A01G 7/045* (2013.01); *A01G 22/00* (2018.02); *F21K 9/00* (2013.01); *Y02P 60/149* (2015.11)

(58) Field of Classification Search
CPC .................................. A01G 7/045; A01G 1/001
See application file for complete search history.

(56) References Cited

U.S. PATENT DOCUMENTS

2009/0288340 A1* 11/2009 Hess ........................ A01G 9/26
47/58.1 LS
2010/0259190 A1* 10/2010 Aikala .................... A01G 7/045
315/294

(Continued)

FOREIGN PATENT DOCUMENTS

EP         1 479 286 A1     11/2004
JP         2001-95376 A      4/2001

(Continued)

OTHER PUBLICATIONS

HortScience, "Plant Productivity in Response to LED Lighting," Dec. 2008, vol. 43(7).*

(Continued)

*Primary Examiner* — Jessica B Wong
(74) *Attorney, Agent, or Firm* — Oblon, McClelland, Maier & Neustadt, L.L.P.

(57) ABSTRACT

A method for raising leaf-and-stem vegetables and a light source device used in the method, which can make production cost of leaf-and-stem vegetables reduced and commercial value thereof enhanced by irradiating parts of leaf-and-stem vegetable with a light optimum therefor. The method for raising leaf-and-stem vegetables by irradiating the vegetables with light, includes a stem growth-inhibiting light source irradiating tops of the stems with light having a blue component light at high ratio, which inhibits the growth of (Continued)

stems, at least during an initial growth period when the stems and leaves become distinguishable from each other.

3 Claims, 9 Drawing Sheets

(56) References Cited

U.S. PATENT DOCUMENTS

| | | | | |
|---|---|---|---|---|
| 2013/0283683 | A1* | 10/2013 | Ringbom | A01G 9/26 47/58.1 LS |
| 2014/0165462 | A1* | 6/2014 | Shigyo | A01G 33/00 47/58.1 LS |

FOREIGN PATENT DOCUMENTS

| | | |
|---|---|---|
| JP | 2006 304610 | 11/2006 |
| JP | 2010 279325 | 12/2010 |
| JP | 2011 97900 | 5/2011 |
| JP | 2012-205520 A | 10/2012 |
| JP | 2013 5741 | 1/2013 |
| RU | 2 369 086 C1 | 10/2009 |
| WO | WO 2013/131024 A1 | 9/2013 |

OTHER PUBLICATIONS

Written Opinion dated May 23, 2016 in Singaporean Patent Application No. 11201506689U.
International Search Report dated May 20, 2014 in PCT/JP2014/053663 Filed Feb. 17, 2014.
Extended European Search Report dated Jan. 29, 2016 in Patent Application 14757087.3.
Office Action dated Feb. 6, 2018, in Japanese Patent Application No. 2015-502867 (with English language translation).
Office Action dated Jan. 23, 2018, in Russian Patent Application No. 2015136506/13 (with English language translation).
Office Action dated May 10, 2018 in Russian Application No. 2015136506/13 filed Feb. 17, 2014 (w/English translation).

* cited by examiner

METHOD FOR RAISING LEAF-AND-STEM VEGETABLES AND LIGHT SOURCE DEVICE FOR RAISING LEAF-AND-STEM VEGETABLES

TECHNICAL FIELD

The present invention relates to a method for raising leaf-and-stem vegetables by being irradiated with specific lights on the same, and a light source device for raising leaf-and-stem vegetables, which is adapted to be used for irradiating the leaf-and-stem vegetables.

BACKGROUND ART

A lighting device for plant cultivation, which irradiates a plant with an artificial light necessary for growth of plant to cultivate the same, is disclosed in Patent Document 1, as prior art. This document discloses a structure of a light emission unit that has a plurality of light emission bodies emitting light therefrom, and is formed such that the light emission bodies are regularly arranged from a center of the light emission unit to a periphery thereof. The light emission bodies are disposed such that a plurality of or respective light emission bodies can be optionally lighted on, dimmed, or lighted off in combination with each other in accordance with the growth of the plant. More specifically, the light emission unit is provided with a plurality of light emission zones that are sectioned by a plurality of concentrically circular boundary lines from a central part toward a circumference thereof. The light emission zones are arranged such that a central light emission zone emits a red light, the second light emission zone from the central part emits a blue light, the third light emission zone from the central part emits a multiple color light composed of the red light, the blue light and a green light, and the fourth light emission zone from the central part emits the green light. In accordance with the growth of the plant, the respective light emission zone emits light in order from the central light emission zone to the peripheral light emission zones. With this arrangement, the plant is irradiated with optimum light by a lighting control in accordance with the growth state of the plant while reducing the light irradiated area.

CITATION LIST

Patent Literature

[Patent Literature 1] JP 2010-279325A

SUMMARY OF INVENTION

Technical Problem

The above-described conventional lighting device for plant cultivation, however, does not disclose what part of the plant is irradiated with the light of the different color sectioned by the light emission zone, and consequently, it is considered that the light of different color is irradiated on the entire plant from respective light emission zones without any definite object. Therefore, even if the light of different color is irradiated on the plant from the light emission bodies in accordance with the growth period, the parts of the plant, which do not require to be irradiated with light, are also irradiated, so that the irradiation efficiency may be decreased, and thereby power is consumed in waste to increase production cost.

Figure 11:
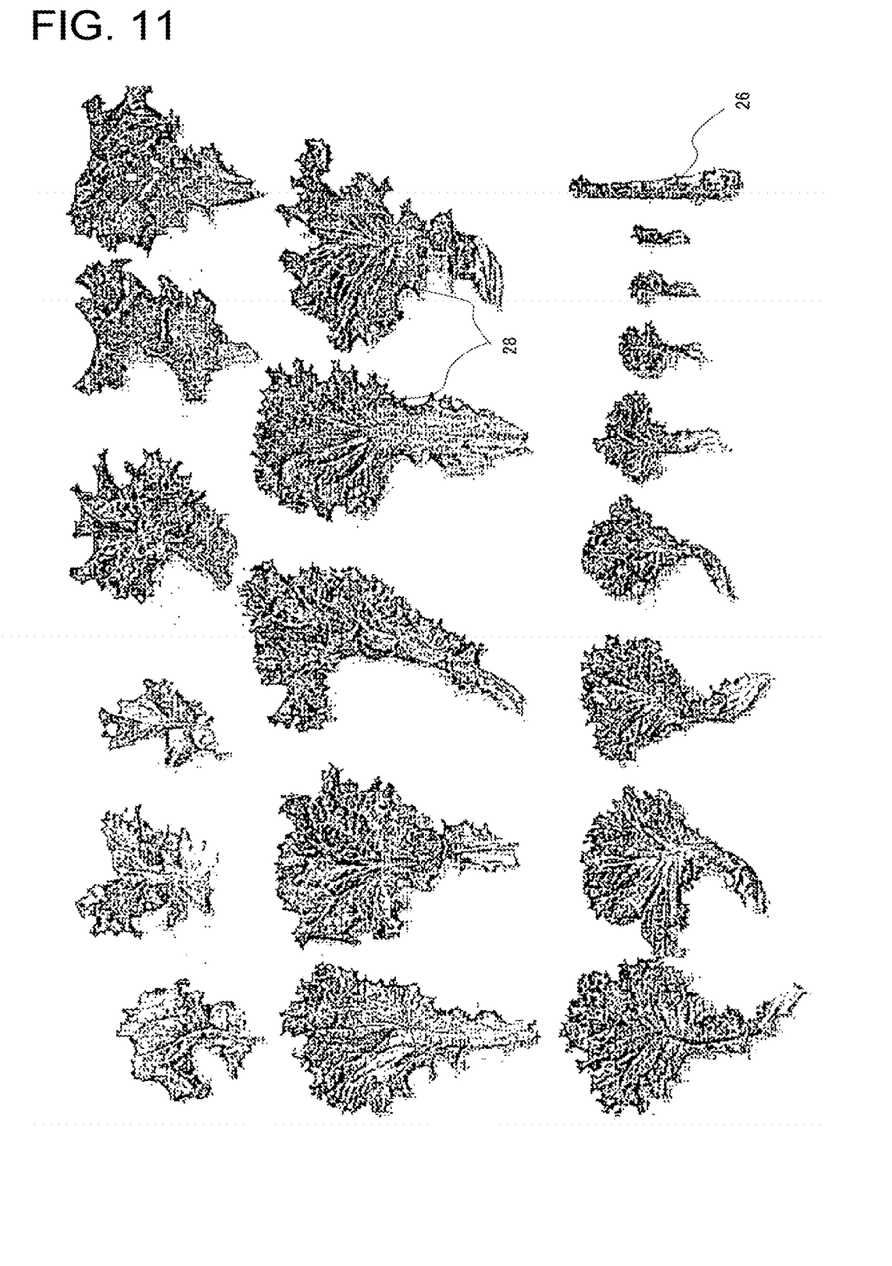
FIG. 11 is a photograph showing the divided state of a leaf lettuce after grown, which is raised by being irradiated with white LEDs light, for comparison.
Figure 12:
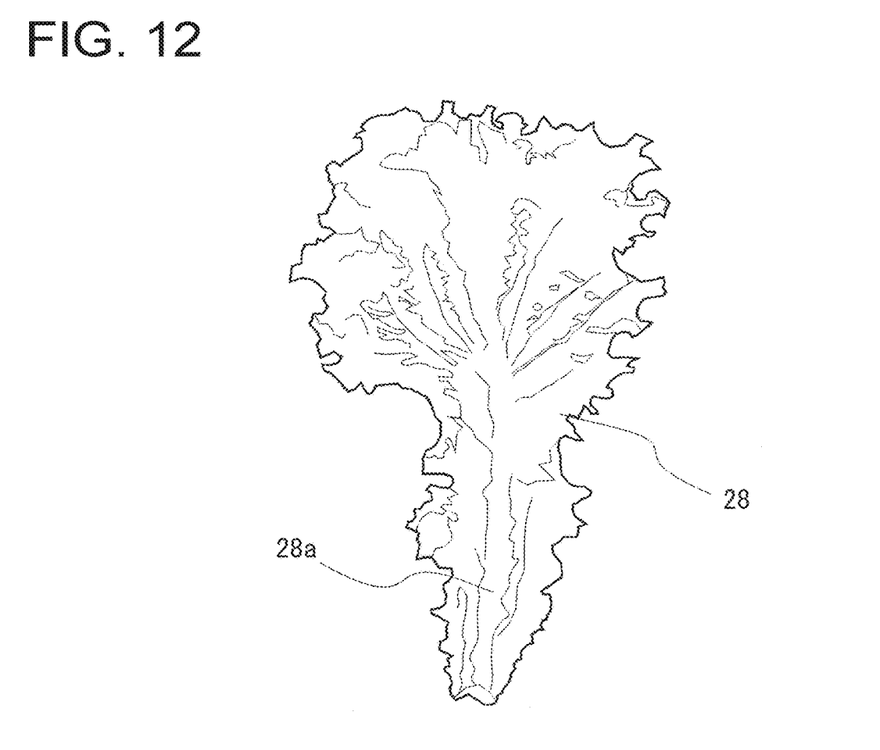
FIG. 12 is a view showing a piece of a leaf of a leaf lettuce after grown, which is raised by being irradiated with white LEDs light.
Figure 13:
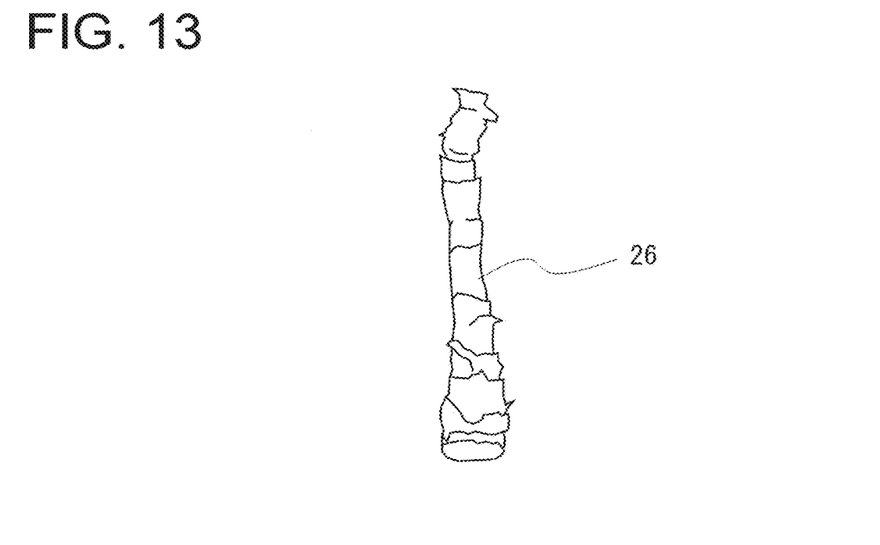
FIG. 13 is a view showing a stem of a leaf lettuce after grown, which is raised by being irradiated with white LEDs light.
Figure 14:
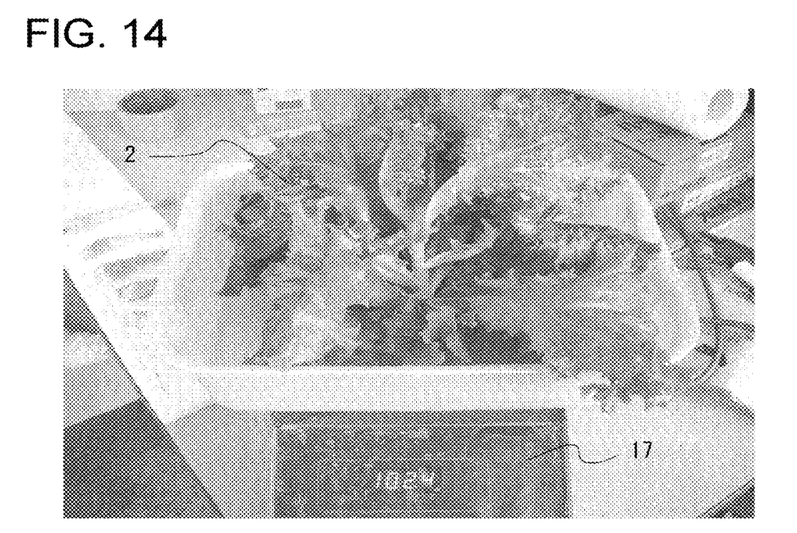
FIG. 14 is a photograph of a leaf lettuce after grown by being irradiated with white LEDs light, which is placed on a weight meter.

Further, as shown in FIGS. 11 to 14, the present inventors have examined the growing condition of a leaf lettuce raised by being irradiated with white LEDs light. At first, as shown in FIG. 14, a leaf lettuce 2 placed on a weight meter 17 gives an impression that a stem 26 is extending, leaves 28 are in pale green color and the entire leaves 28 were thinly distributed without crowded. When the stem is separated from the leaves, as shown in FIG. 11 and FIG. 12, the leaves 28 do not greatly spread, and a leaf stalk 28a extends long. As shown in FIG. 11 and FIG. 13, the stem 26 extends long as a whole. Since the leaves 28 of the leaf lettuce are mainly eaten, so that when the stem 26 extends long, the commercial value of the leaf lettuce may be degraded.

The present invention is made considering the above-described conventional problem, and provides a method for raising leaf-and-stem vegetables, which is capable of reducing production cost and producing the leaf-and-stem vegetables of a high commercial value by efficiently irradiating the leaf-and-stem vegetables with light suitable for the growth thereof, and a light source device for raising the leaf-and-stem vegetables, which is used in the above method for raising leaf-and-stem vegetables.

Solution to Problem

In order to solve the above-described problem, the method for raising leaf-and-stem vegetables by irradiating the same with light according to a first aspect of the invention includes the step of providing a stem growth-inhibiting period when a stem growth-inhibiting light source irradiates tops of the stems with light having a blue component light at high ratio, which inhibits the growth of stems, at least during an initial growth period when the stems and leaves become distinguishable from each other.

The method for raising leaf-and-stem vegetables according to a second aspect of the invention is characterized in that in the feature of the above first aspect of the invention, further including the step for a leaf growth-accelerating light source to irradiate the leaves of the leaf-and-stem vegetables with light having a red component light at high ratio, which accelerates the growth of the leaves in the stem growth-inhibiting period.

The method for raising leaf-and-stem vegetables according to a third aspect of the invention is characterized in that in the feature of the above first or second aspect of the invention, the leaf-and-stem vegetables are selected among head-non-forming lettuces, Brassica campestris, pak-choi and Spinach.

The method for raising leaf-and-stem vegetables according to a fourth aspect of the invention is characterized in that in the feature of any one of the above first through third aspect of the inventions, the stem growth-inhibiting light source is composed of LEDs or organic ELs.

The light source device for raising leaf-and-stem vegetables, which is adapted to irradiate the leaf-and-stem vegetables with light to raise the same according to a fifth aspect of the invention includes a stem growth-inhibiting light source device for irradiating the area facing to the stems of the leaf-and-stem vegetables with a stem growth-inhibiting light having a blue component light at high ratio, which inhibits the growth of stems, and a leaf growth-accelerating light source device for irradiating the area facing to the leaves of the leaf-and-stem vegetables with a leaf growth-accelerating light having a red component light at high ratio, which accelerate growth of leaves.

Advantageous Effects of Invention

According to the first aspect of the invention, there is provided the stem growth-inhibiting period when the stem growth-inhibiting light source irradiates tops of the stems in which there are plant growing points with light having the blue component light at high ratio, which inhibits the growth of stems at least during an initial growth period when the stems and leaves become distinguishable from each other. Therefore, the growth of the stems that are scarcely used for food is inhibited, whereas nutrients used for growth are taken into the whole leaves, thereby accelerating the growth of the leaves. As a result, the leaf-and-stem vegetables are enhanced in appearance as vegetables, thereby improving the commercial value thereof.

According to the second aspect of the invention, the leaf growth-accelerating light source irradiates the leaves with the light having the red component light at high ratio, which accelerates the growth of leaves in the stem growth-inhibiting period. Therefore, the growth of the leaves used for food is accelerated, whereby the leaf-and-stem vegetables of an increased commercial value as ingredients can be raised, and the harvested amount thereof can be increased.

According to the third aspect of the invention, the leaf-and-stem vegetables are selected among head-non-forming lettuces, brassica campestris, pak-choi and spinach, and mainly the leaves thereof are used for food, so that the commercial value of these leaf-and-stem vegetables can be improved.

According to the fourth aspect of the invention, the stem growth-inhibiting light source is composed of LEDs or organic ELs so that the power consumption is small to save energy, and the durable life as the light source is long, thereby it is possible to decrease the running cost. In addition, the LEDs can be readily adjusted in the wavelength of light emitted therefrom to produce monochromatic lights. With regard to the organic ELs, heat generated from light sources is small to prevent damages to the leaves due to heat.

According to the fifth aspect of the invention, the light source device for raising leaf-and-stem vegetables includes the stem growth-inhibiting light source device for irradiating the area facing to the stems of the leaf-and-stem vegetables with the stem growth-inhibiting light having the blue component light at high ratio adapted to inhibit the growth of stems, and the leaf growth-accelerating light source device for irradiating the area facing to the leaves of the leaf-and-stem vegetables with the leaf growth-accelerating light having the red component light at high ratio adapted to accelerate the growth of leaves, and accordingly, the stem growth-inhibiting light source can irradiate tops of the stems with a light having a blue component light at high ratio adapted to inhibit the growth of the stems, whereas the leaf growth-accelerating light source can irradiate the leaves with light having a red component light at high ratio adapted to accelerate the leaves.

DESCRIPTION OF EMBODIMENTS (Embodiment)

Figure 1:
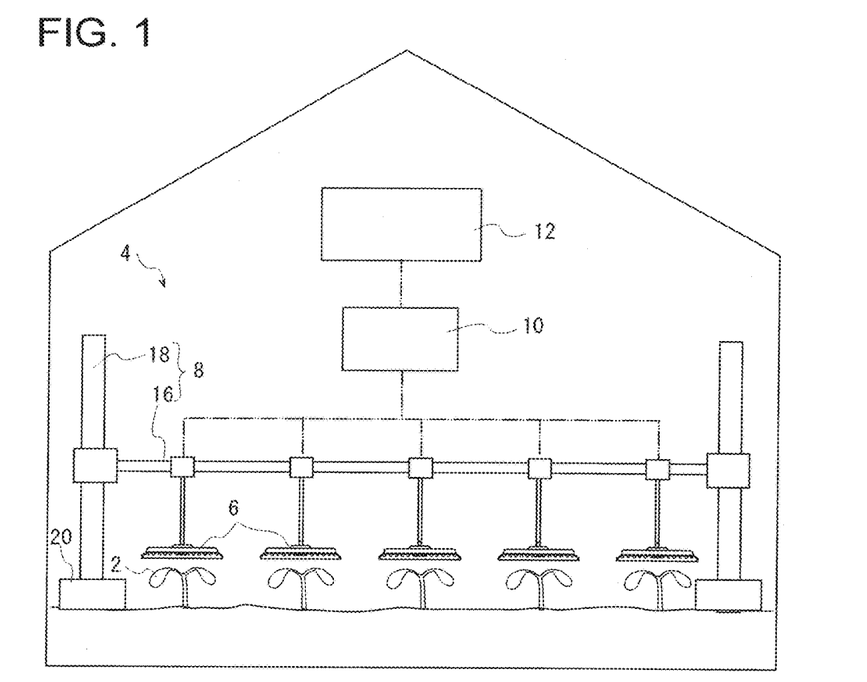
FIG. 1 is a view showing a leaf-and-stem vegetables-raising system in which a method for raising the leaf-and-stem vegetables in accordance with the present invention is applied to the raising of leaf lettuces.
Figure 2:
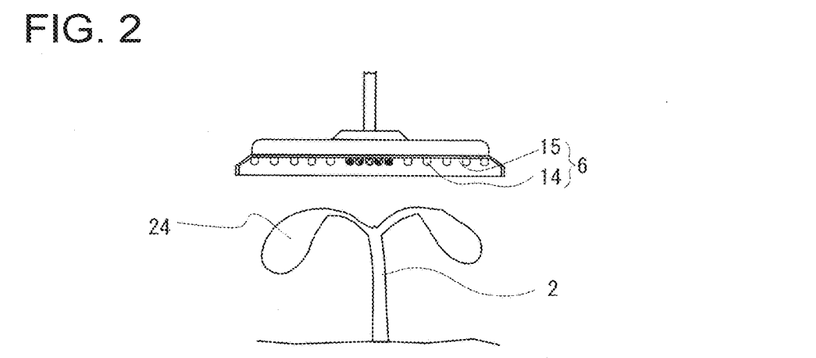
FIG. 2 is an enlarged view showing a part of a light source device for raising the leaf-and-stem vegetables.

Hereinafter, the method for raising leaf-and-stem vegetables that uses a leaf-and-stem vegetables-raising system including a light source device for raising the leaf-and-stem vegetables in accordance with the present invention will be explained with reference to the drawings. In the present embodiment, leaf lettuces 2 were used as the leaf-and-stem vegetables. As shown in FIG. 1, a leaf-and-stem vegetables-raising system 4 includes light source devices 6 for raising the leaf-and-stem vegetables, each having LEDs, a light source supporting device 8 that supports the light source devices 6 for raising the leaf-and-stem vegetables so that the light source devices can face optional positions of the leaf lettuces, a power supplying unit 10 for supplying power to the light source devices 6 for raising the leaf-and-stem vegetables, and an irradiation controlling device 12 for controlling the variety of combinations of colors of light emitted from the LEDs and the intensity of the light, which are emitted from the light source devices 6 for raising the leaf-and-stem vegetables.

Figure 3:
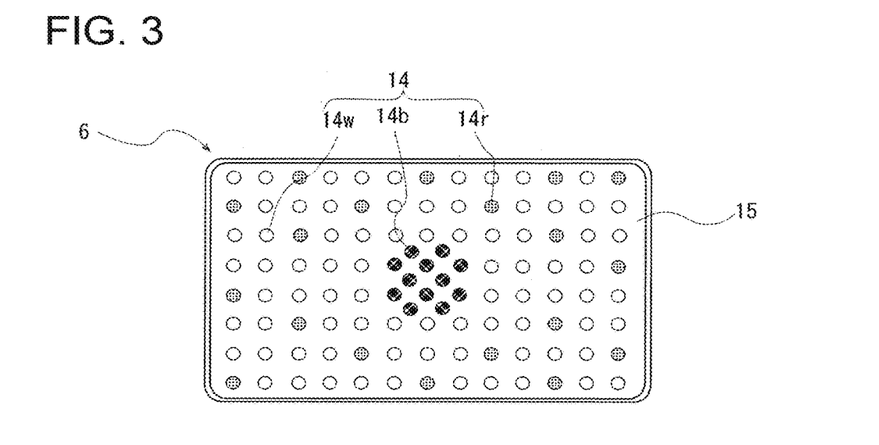
FIG. 3 is a bottom view showing the arrangement of light emission bodies of the light source device for raising the leaf-and-stem vegetables.

As shown in FIG. 3, the light source device 6 for raising the leaf-and-stem vegetables is constituted such that a plurality of shell type LEDs (light emitting diodes) 14 are arranged on a bottom surface of a rectangular substrate. A plurality of blue LEDs 14b are gathered and disposed on a central part of a substrate 15, whereas white LEDs 14w and red LEDs 14r are uniformly mixed and disposed on a peripheral part thereof. The blue LEDs 14b are provided in the ratio of 20%, for example, to the entire LEDs 14. The red LEDs 14r are arranged in the ratio of 30%, for example, and the white LEDs 14w are arranged in the ratio of 50%, for example, both in the peripheral part. Each blue LED 14b exhibits a peak wavelength of 470 NM, whereas each red LED 14r exhibits a peak wavelength of 660 NM. The white LEDs 14w can be produced by applying a yellow phosphor to the blue LEDs 14b, applying green and red phosphors to the blue LEDs, or applying blue, green and red phosphors to ultraviolet LEDs. In the present embodiment, the yellow phosphor is applied to the blue LEDs.

The power supplying unit 10 supplies power, which can cause only LEDs 14 of a specific color to emit light, or the LEDs 14 to emit light, varying the light intensity. The blue LEDs 14b and the power supplying unit 10 define a stem growth-inhibiting light source device, whereas the red LEDs 14r and the power supplying unit 10 define a leaf growth-accelerating light source device.

The irradiation controlling device 12 includes a light control circuit (not shown), for example, and controls the power supplying unit 10 by means of the light control circuit in accordance with the growing condition of the leaf lettuces 2 to control the lights (lighting on, lighting off, controlling of the irradiation light intensity, for example) irradiated from the blue LEDs 14b, the red LEDs 14r and the white LEDs 14w of the light source device 6. The light intensity of the irradiated light ranges from 50 to 500 $\mu$mol m-2 s-1, for example, as the photosynthesis-effective photon flux density (PPFD).

The light source supporting device 8 includes a support bar 16 that supports the light source devices 6 for raising the leaf-and-stem vegetables, a support pole 18 that is provided with a ball screw mechanism (not shown) therein to vertically movably support the support bar 16, and a driving device 20 for driving the ball screw mechanism to move the support bar 16 vertically, and supports the light source devices 6 for raising the leaf-and-stem vegetables such that the light source devices 6 is movable to the optional positions to face the leaf lettuces 2 to be raised in accordance with the growing condition thereof.

In addition, there is provided with a watering device (not shown) for supplying water along with a liquid fertilizer diluted with water to the leaf lettuces 2. Further, there is provided with a photon sensor (not shown) for detecting the volume of the photon on the tops of the leaf lettuces 2 and supplying detection signals to the irradiation controlling device 12.

Hereinafter, the operation of the light source device for raising the leaf-and-stem vegetables thus arranged will be explained with reference to the drawings.

Figure 4:
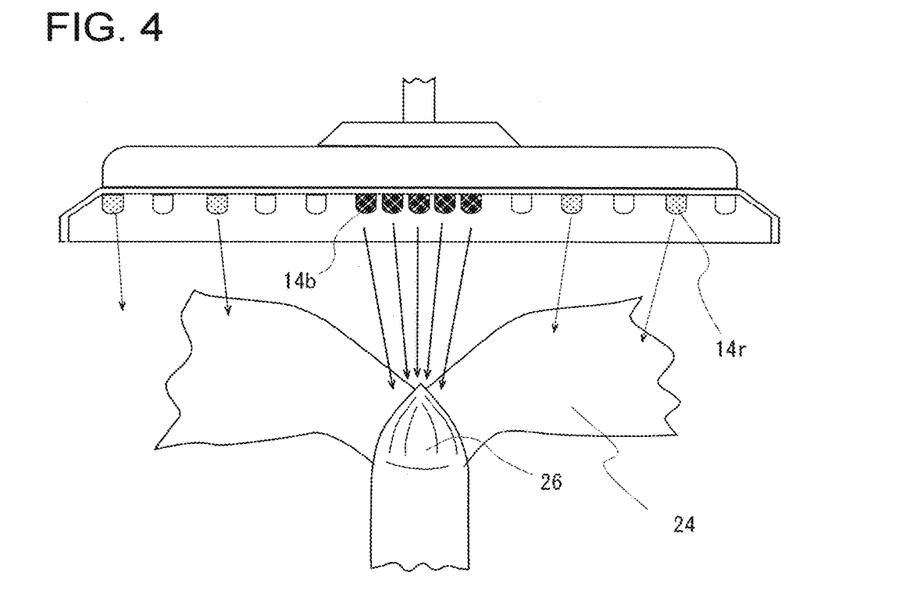
FIG. 4 is a view showing the irradiation condition of the light source device for raising the leaf-and-stem vegetables irradiating a top of a plant body with a light during an initial growth period.

First, seeds of the leaf lettuces 2 are planted, and watered. And, as shown in FIG. 4, seed leaves 24 are germinated from the seeds, and during a period, for example, from the 3rd to 10th day after seeding when the stems 26 and the leaves 28 become distinguishable (corresponding to the initial growth period), light is irradiated from only the blue LEDs 14b on tops of the stems 26, each having a growing point, whereas light is irradiated from the red LEDs 14r on the leaves 28. That is, a stem growth-inhibiting light source 14b irradiate tops of the stems 26 with the light emitted therefrom and a leaf growth-accelerating light source 14r irradiate the leaves 28 with the light emitted therefrom. The irradiation time is determined to 16 hours, for example, per day, and the irradiation light intensity is determined to 50 $\mu$mol m-2 s-1, for example.

Figure 5:
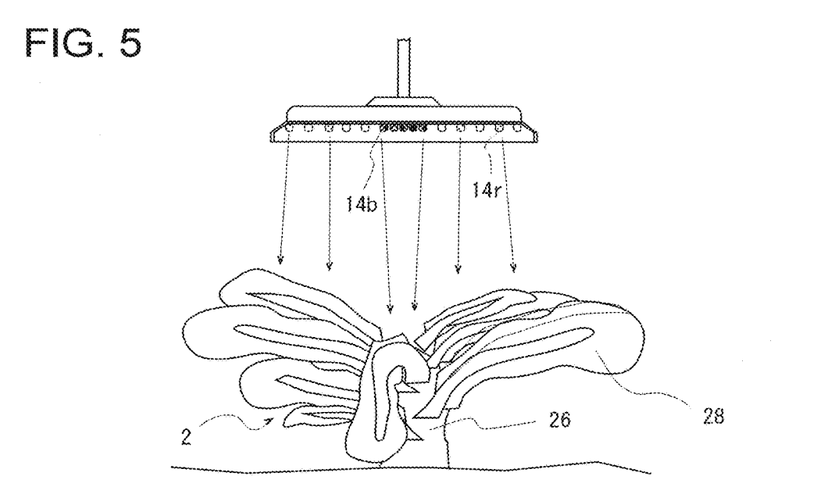
FIG. 5 is a view showing the irradiation condition of a light irradiated from the light source device for raising the leaf-and-stem vegetables on a top of a plant body during a middle growth period.

As shown in FIG. 5, during a period from the 10th to 20th day, lights from the blue LEDs 14b, the red LEDs 14r and the white LEDs 14w are irradiated. The irradiation time is determined to 24 hours, for example, per day, and the irradiation light intensity is determined to 100 $\mu$mol m-2 s-1, for example. In this case, the period from the 3rd day to the 10th day after seeding and the period from the 10th day to the 20th day after seeding, when light is irradiated from the blue LEDs, correspond to the stem growth-inhibiting period.

Figure 6:
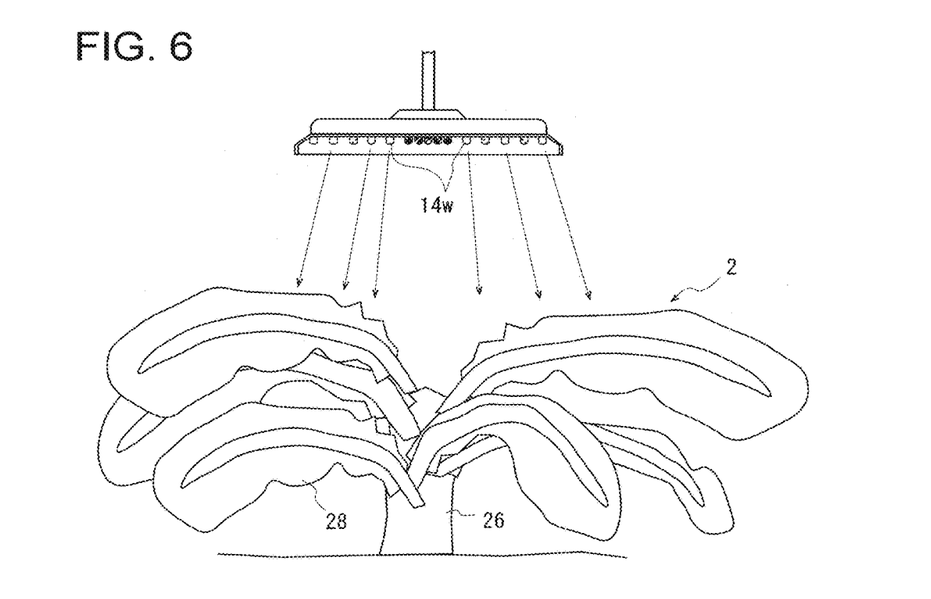
FIG. 6 is a view showing the irradiation condition of a light irradiated from the light source device for raising the leaf-and-stem vegetables on a top of a plant body during a late growth period.

As shown in FIG. 6, during a period from the 20th to 30th day, the light irradiation from the blue LEDs 14b and the red LEDs 14r is stopped, whereas the light irradiation from only the white LEDs 14w is performed. The irradiation time is determined to 24 hours, for example, per day, and the irradiation light intensity is determined to 150 $\mu$mol m-2 s-1, for example.

Figure 7:
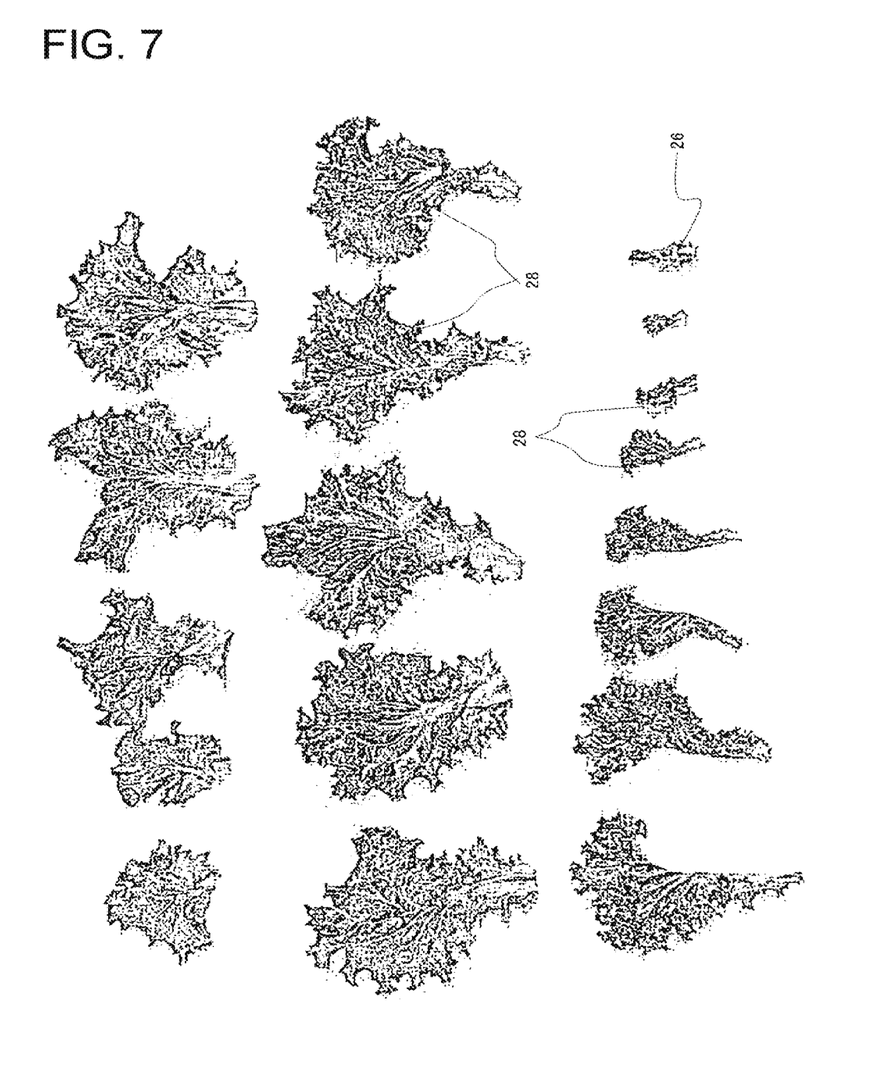
FIG. 7 is a photograph showing the state in which a leaf lettuce after grown according to the present embodiment is divided into leaves and a stem.
Figure 8:
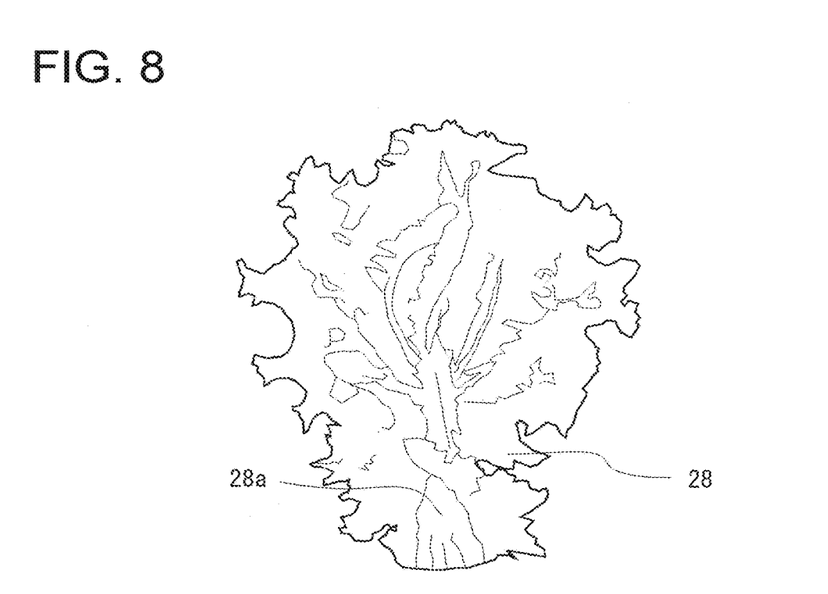
FIG. 8 is a view showing a leaf after grown according to the present embodiment.
Figure 9:
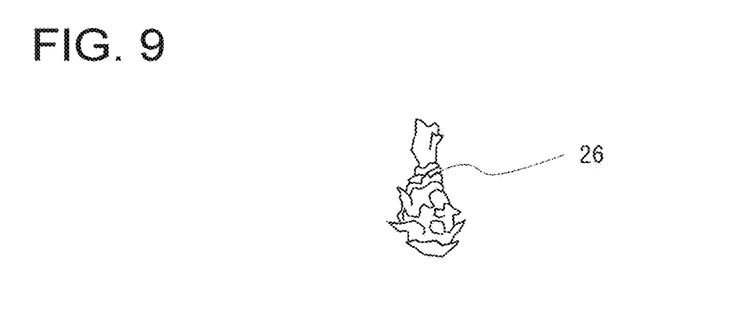
FIG. 9 is a view showing a stem after grown according to the present embodiment.
Figure 10:
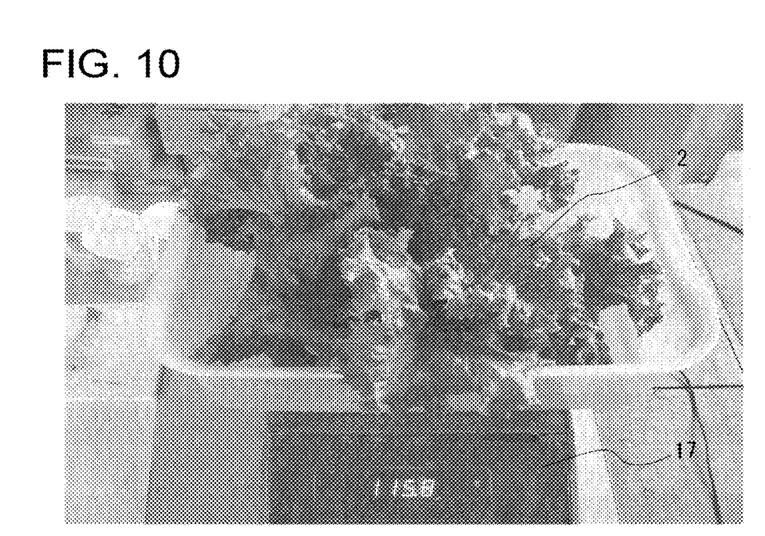
FIG. 10 is a photograph showing a leaf lettuce after grown according to the present embodiment, which is placed on a weight meter.

As shown in FIG. 7 to FIG. 10, the growth state of the leaf lettuce 2 raised by being irradiated with LEDs light, as described above, was examined. First, as shown in FIG. 10, in the grown leaf lettuce 2, leaves 28 are densely grew, and exhibits a deep color, and the weight detected by a weight meter 17 is 115.8 grams. The detected weight is greater than the weight of 102.4 grams of the leaf lettuce raised by being irradiated with the white LEDs light, for comparison. As shown in FIG. 7 and FIG. 8, the leaves 28 spread widely. As shown in FIG. 7 and FIG. 9, the stem 26 is short, being inhibited from growing long. As a result, the ratio of the leaves 28 used for food increases, and thereby the commercial value of the leaf lettuce 2 is increased.

As is apparent from the above description, in the raising method for raising the leaf-and-stem vegetables according to the present embodiment, at least during the initial growing period when the stems 26 and the leaves 28 become distinguishable from each other, there is provided a stem growth-inhibiting period when the tops of the stems 26, each having a growing point of plant, is irradiated with the blue LEDs light that inhibits the growth of the stems 26. Therefore, the growth of the stems 26 that are scarcely used for food is inhibited, whereas nutrients used for growth are taken into the whole leaves, thereby accelerating the growth of the leaves 28. As a result, the leaf-and-stem vegetables are enhanced in appearance as vegetables, thereby improving the commercial value thereof.

Further, light from the red LEDs, which accelerates the growth of the leaves, is irradiated on the leaves 28. Therefore, the growth of the leaves 28 used for food is accelerated, and as a result, the leaf-and-stem vegetables of an increased commercial value as ingredients can be raised. In addition, the harvested amount can be increased.

Furthermore, in the case of the head-non-forming lettuces (leaf lettuces), the leaves 28 are mainly used for food, so that the commercial value of the leaf lettuces can be improved.

Moreover, the stem growth-inhibiting light source is composed of LEDs 14 so that the power consumption is reduced, and thereby energy saving can be achieved, and since the durable life thereof as the light source is long, running cost can be decreased. In addition, LEDs 14 can be readily adjusted in the wavelength of light emitted therefrom to produce monochromatic lights.

The light source device 6 for raising leaf-and-stem vegetables is provided with the stem growth-inhibiting light source device (blue LEDs) that irradiates the area facing to the stem 26 of the leaf-and-stem vegetable with a stem growth-inhibiting light having a blue component light at high ratio, which inhibits the growth of the stem 26, and the leaf growth-accelerating light source device (red LEDs) that irradiates the area facing to the leaves 28 of the leaf-and-stem vegetable with a leaf growth-accelerating light having a red component light at high ratio, which accelerates the growth of the leaves 28, whereby the light from the blue LEDs for inhibiting the growth of the stem 26 can be irradiated on the top of the stem 26, whereas the light from the red LEDs for accelerating the growth of the leaves can be irradiated on the leaves 28.

In the present embodiment, LEDs 14 are used as the light emission bodies of the light source devices 6, but the light emission bodies are not limited thereto, so organic ELs, for example, may be used. At the organic ELs, the power consumption is small, which reduces the power cost, and the generation of heat as the light source is also small to prevent damages to the leaves due to heat.

Further, in the present embodiment, leaf lettuces 2 are used as the leaf-and-stem vegetables, but the leaf-and-stem vegetables are not limited to the leaf lettuces, so that brassica campestris, pak-choi or spinach, for example, may be used.

The blue LEDs 14b are arranged in the central part in the ratio of 20% to the entire LEDs, whereas the red LEDs 14r and the white LEDs 14 are respectively arranged in the peripheral part in the ratio of 30% and 50%, but the arrangement of the LEDs is not limited to the above-described arrangement, so that, for example, the blue LEDs may be arranged in the central part in the ratio of 30% to the entire LEDs, whereas the red LEDs and the white LEDs may be respectively arranged in the peripheral part in the ratios of 40% and 30%, and the arrangement of the light emission bodies can be arbitrarily modified in accordance with the plants (leaf-and-stem vegetables) to be irradiated.

As is apparent from the preceding explanation, the specific arrangement disclosed in the above-described embodiment merely shows one example of the present invention, and the present invention is not limited to the above-described specific arrangement, but is intended to cover various modifications without departing from the spirit and scope of the present invention.

INDUSTRIAL APPLICABILITY

The present invention can be used where the leaf-and-stem vegetables of a high commercial value are efficiently produced.

The invention claimed is:

1. A method, by a light source device, for raising a leaf-and-stem vegetable, the light source device being configured to irradiate, by a plurality of blue LEDs in a central part of an arrangement of LEDs, an area facing a stem of the leaf-and-stem vegetable with blue LEDs light, irradiate, by a plurality of red LEDs in a peripheral part of the arrangement of LEDs, an area facing leaves of the leaf-and-stem vegetable with red LEDs light, and irradiate, by a plurality of white LEDs mixed with the red LEDs in the peripheral part of the arrangement of LEDs the area facing the leaves with white LEDs light, the method comprising:

moving the arrangement of LEDs to a position so that the arrangement of the blue LEDs faces and irradiates a top of the stem with the blue LEDs light and the arrangement of the red LEDs faces and irradiates the leaves with the red LEDs light during an initial growing period when the stem and the leaves become distinguishable from each other; and stopping light irradiation from the blue LEDs and red LEDs, performing light irradiation from the white LEDs, and moving vertically the arrangement of LEDs to a position so that the arrangement of the white LEDs irradiates the leaves with the white LEDs light during a late growth period, wherein the initial growth period is from the 3rd to 10th day after seeding and the late growth period is from the 20th to 30th day after seeding.

2. The method for raising a leaf-and-stem vegetable according to claim 1, wherein the leaf-and-stem vegetable is selected among head-non-forming lettuces, brassica campestris, pak-choi, and spinach.

3. A light source device for raising a leaf-and-stem vegetable, wherein the light source device comprises:

a substrate that supports a plurality of blue LEDs provided at a central part of a bottom surface of the substrate, the plurality of blue LEDs being configured to irradiate an area facing a stem of the leaf-and-stem vegetable with blue LEDs light;

a plurality of red LEDs provided at a peripheral part of the bottom surface of the substrate and configured to irradiate an area facing leaves of the leaf-and-stem vegetable with red LEDs light;

a plurality of white LEDs mixed with the red LEDs and disposed at the peripheral part of the substrate and configured to irradiate the area facing the leaves of the leaf-and-stem vegetable with white LEDs light;

a light source supporting device that is configured to support and vertically move the substrate to different positions; and an irradiation controlling device configured to control the variety of combinations of colors of light emitted from the blue LEDs, red LEDs and white LEDs, wherein the light source device is configured to move the plurality of LEDs to a position so that the blue LEDs face and irradiate a top of the stem with the blue LEDs light and the red LEDs face and irradiate the leaves with the red LEDs light during an initial growing period when the stem and the leaves become distinguishable from each other; and stop light irradiation from the blue LEDs and red LEDs, perform light irradiation from the white LEDs, and move vertically the plurality of LEDs to a position so that the white LEDs irradiate the leaves with the white LEDs light during a late growth period, wherein the initial growth period is from the 3rd to 10th day after seeding and the late growth period is from the 20th to 30th day after seeding.

* * * * *